United States Patent [19]
Kino et al.

[11] Patent Number: 6,051,080
[45] Date of Patent: Apr. 18, 2000

[54] ROLLING ELEMENT USED FOR TOROIDAL-TYPE CONTINUOUSLY VARIABLE TRANSMISSION AND METHOD FOR PRODUCING SAME

[75] Inventors: Nobuo Kino; Toshifumi Hibi, both of Kanagawa, Japan

[73] Assignee: Nissan Motor Co., Ltd., Kanagawa, Japan

[21] Appl. No.: 08/994,321

[22] Filed: Dec. 19, 1997

[30] Foreign Application Priority Data

Dec. 20, 1996 [JP] Japan .................................. 8-342006

[51] Int. Cl.$^7$ ............................. C23C 8/22; F16H 15/38; F16C 33/00
[52] U.S. Cl. ......................... 148/319; 148/906; 148/215; 148/219; 148/226; 148/233; 476/40; 476/72; 384/625
[58] Field of Search ..................... 148/906, 319, 148/215, 219, 226, 233; 476/40, 72; 384/625

[56] References Cited

U.S. PATENT DOCUMENTS

| | | |
|---|---|---|
| 5,556,348 | 9/1996 | Kokubu et al. . |
| 5,976,053 | 11/1999 | Kino et al. ................................ 476/73 |

FOREIGN PATENT DOCUMENTS

| | | |
|---|---|---|
| 5-168860 | 7/1993 | Japan . |
| 0589393A2 | 9/1993 | Japan . |
| 9-86928 | 3/1997 | Japan . |

OTHER PUBLICATIONS

John J. Coy et al. *"Fatigue Life Analysis for Traction Drives with Application to a Toroidal Type Geometry"*. Dec. 1976, pp. 1–31.

Japanese Industrial Standard (JIS) G 4805, 1970) 066–NM–97 (2) pp. 1036 & 1037 High Carbon Chromium Bearing Steels.

*Primary Examiner*—Deborah Yee
*Attorney, Agent, or Firm*—McDermott, Will & Emery

[57] ABSTRACT

The invention relates to a power roller used for a toroidal-type continuously variable transmission. This power roller has on its first side a groove for receiving a bearing, and the surface of the groove (bearing surface) has a carbon concentration which is not lower than that of the back surface of a second side opposed to the first side. The power roller has a hardened outer layer having first and second portions which are respectively defined by the bearing surface and the back surface. The first portion of the hardened outer layer has an effective depth which is not shallower than that of the second portion thereof. The power roller is prepared by the sequential steps of surface-hardening, quenching, and grinding. The surface-hardening process is one of carburizing and carbonitriding. The grinding includes the sequential steps of: (1) grinding at least one of first and second outer portions a quenched preform of the power roller to remove the same, such that there is obtained a datum that is at least one of the surface of the groove and the inner flat surface which are respectively exposed by removing the first and second outer portions; and (2) grinding a third outer portion of the quenched preform, based on the datum, thereby to remove the third outer portion. The bearing surface of the power roller becomes high in carbon concentration, and the first portion of the hardened outer layer of the power roller becomes sufficiently deep in effective thickness.

20 Claims, 5 Drawing Sheets

ROLLING ELEMENT USED FOR TOROIDAL-TYPE CONTINUOUSLY VARIABLE TRANSMISSION AND METHOD FOR PRODUCING SAME

The contents of Japanese Patent Application No. 8-342006, with a filing date of Dec. 20, 1996, are hereby incorporated by reference.

BACKGROUND OF THE INVENTION

The present invention relates in general to a toroidal-type continuously variable transmission used in vehicles such as automobiles, and more particularly to a power roller of a rolling element used for the transmission, and a method for producing the power roller. This rolling element of the transmission is defined as being a combination of the power roller, an input side disk and an output disk, as will be clarified hereinafter.

Figure 6:
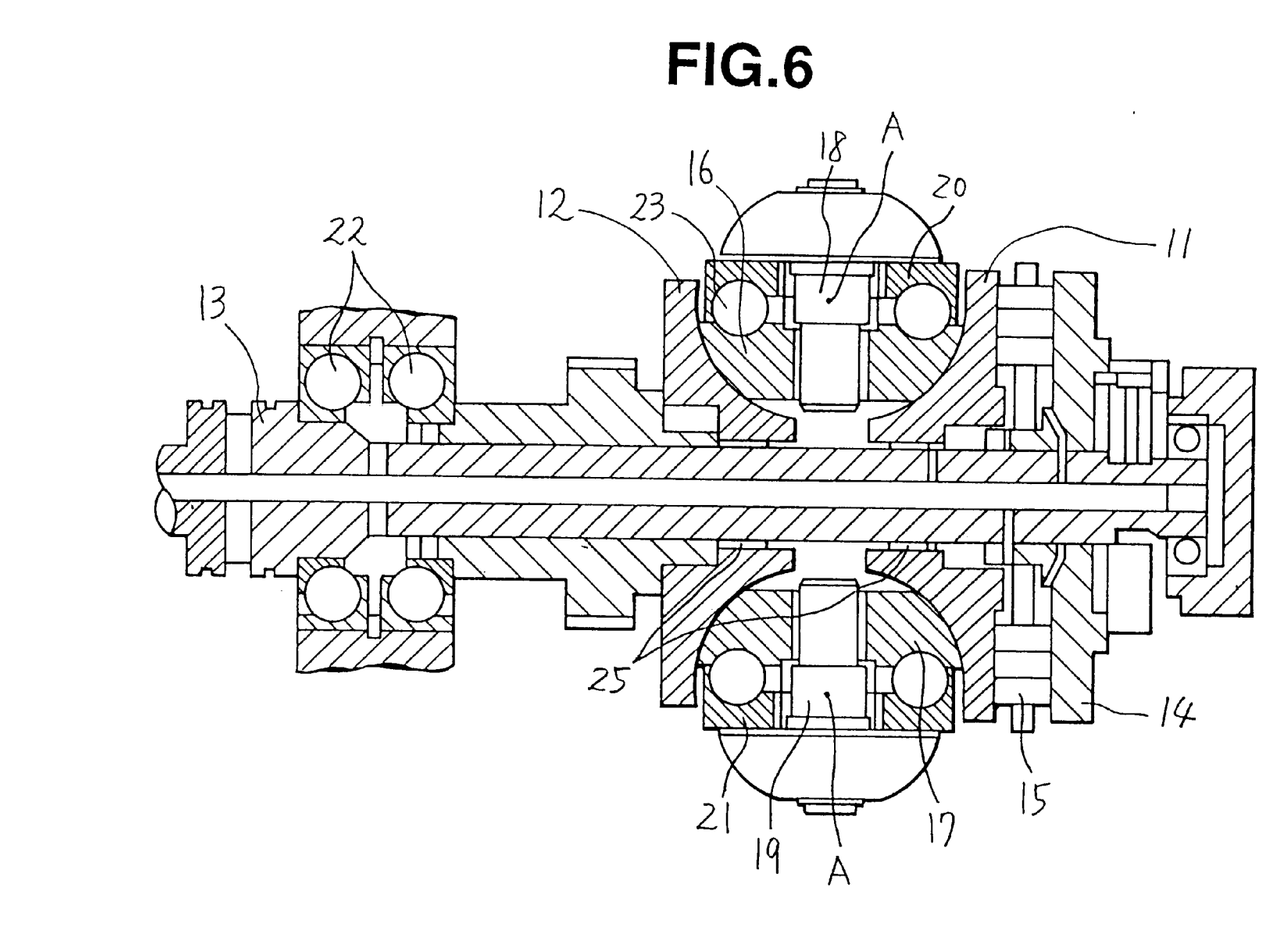
FIG. 6 is a sectional view showing the construction of a part of a toroidal-type continuously variable transmission, to which the present invention can be applied.

A conventional toroidal-type continuously variable transmission is, as shown, for example, in FIG. 6, constructed so that an input side disk 11 and an output side disk 12 are coaxially disposed so as to be opposed to each other inside a housing (not shown in FIG. 6). An input shaft 13 passes through the shaft center of the toroidal transmission section having the input side disk and the output side disk. A loading cam 14 is disposed on an end of the input shaft 13. The loading cam 14 transmits the motive power (rotational force) of the input shaft 13 to the input side disk 11 through a cam roller 15.

The input side disk 11 and the output side disk 12, having substantially the same shape, are disposed so as to be symmetrical, and formed so as to be substantially semicircular in section as viewed in the axial direction with both opposed surfaces thereof taken into view. A pair of power rollers 16 and 17 that transmit motion are disposed so as to be in contact with the input side disk 11 and the output side disk 12, respectively, within a toroidal cavity formed by the toroidal surfaces of the input side disk 11 and the output side disk 12. Reference numeral 23 designates thrust ball bearings. In this case, the power rollers 16 and 17 are pivotably attached to trunnions 20 and 21 through pivots 18 and 19, and pivotably supported with a pivot A as the center, the pivot A serving as the center of the toroidal surface of the input side disk 11 and the output side disk 12. The surfaces of contact among the input side disk 11, the output side disk 12, and the power rollers 16 and 17 are supplied with a lubricating oil whose viscous frictional resistance is large, so that the motive power applied to the input side disk 11 is transmitted to the output side disk 12 through the lubricating oil film and the power rollers 16 and 17.

The input side disk 11 and the output side disk 12 are independent of the input shaft 13 (not being directly affected by the motive power of the input shaft 13) through needles 25. An output shaft 24 is attached to the output side disk 12. The output shaft extends in parallel with the input shaft 13 and is rotatably supported by the housing through an angular bearing 22.

In this toroidal-type continuously variable transmission, the motive power of the input shaft 13 is transmitted to the loading cam 14. When the loading cam 14 is rotated by the transmission of the motive power, this rotational power is transmitted to the input side disk 11 through the cam roller 15, which in turn causes the input side disk 11 to rotate. The motive power generated by the rotation of the input side disk 11 is transmitted to the output side disk 12 through the power rollers 16 and 17. The output side disk 12 rotates integrally with the output shaft 24.

At the time of changing the speed, the two trunnions 20 and 21 are slightly moved toward the pivot A. That is, the axial movement of the trunnions 20 and 21 releases the intersection between the rotating shaft of the power rollers 16 and 17 and the shafts of the input side disk 11 and the output side disk 12. As a result, the power rollers 16 and 17 oscillates over the surfaces of the input side disk 11 and the output side disk 12, thereby changing the speed ratio to either accelerate or decelerate the motor vehicle.

Such a toroidal-type continuously variable transmission is disclosed, for example, in U.S. Pat. No. 5,556,348 corresponding to Japanese Patent Unexamined Publication No. 7-71555. In this patent '348, effective carburized depths of the input side disk, the output side disk, and the power roller are limited to fall in a range of from 2.0 mm to 4.0 mm. As conventional examples of the above-mentioned input side disk, output side disk, and power rollers, those using AISI 52100 (equivalent of a high carbon chromium bearing steel having a symbol of SUJ 2 according to Japanese Industrial Standard (JIS) G 4805, 1970) are known (see NASA Technical Note, NASA TN D-8362, Dec. 1976).

When the above-mentioned toroidal-type continuously variable transmission is driven, the bearing surface of the power roller receives a high load from the input side disk and the output side disk. Furthermore, the power roller rotates at a high speed, while engaging with both the input side disk and the output side disk. Thus, the bearing surface of the power roller is subjected to high temperature and high pressure, and therefore tends to flake due to the rolling contact fatigue. In other words, when the power roller is in a rolling contact with the input side disk and the output side disk under high temperature and high pressure, heat generated by the rolling contact tends to lower the hardness of an outer layer of the power roller. With this, the outer layer lowers in fatigue strength and thus tends to flake. In view of this, the outer layer of the power roller is required to have a sufficient strength or hardness at high temperature, that is, temper hardness. The power roller may be subjected to a hardening process, that is, a carburizing or carbonitriding process, in order to harden the surface of the same. The strength of the power roller at high temperature is greatly affected by the carbon or carbon and nitrogen concentrations of the outer layer of the same which has been subjected to the hardening process. In fact, when the outer layer of the power roller is low in carbon or carbon and nitrogen concentrations, this outer layer becomes low in high-temperature strength. With this, the power roller becomes insufficient in rolling fatigue life. Furthermore, if each outer layer of the power rollers varies to a great extent in carbon or carbon and nitrogen concentrations, the outer layer will have a wide variation in high-temperature strength and thus in rolling fatigue life. This is a disadvantage in the production of power roller in an industrial scale.

SUMMARY OF THE INVENTION

It is therefore an object of the present invention to provide a rolling element used for a toroidal-type continuously variable transmission, which rolling element has a power roller having a bearing surface superior in durability, particularly in rolling fatigue strength, under high temperature and high surface stress.

It is another object of the present invention to provide a method for producing such rolling element.

According to the present invention, there is provided a rolling element used for a toroidal-type continuously variable transmission. This rolling element includes an input side disk adapted to be disposed on an input shaft of the transmission; an output side disk adapted to be disposed on an output shaft of the transmission; and a power roller for transmitting motive power of the input shaft to the output shaft, while engaging both the input side disk and the output side disk.

According to the present invention, the power roller is prepared by a method including the sequential steps of (a) subjecting a preform of the power roller to a surface-hardening process which is one of a carburizing process and a carbonitriding process, thereby to prepare a surface-hardened preform; and (b) subjecting the surface-hardened preform to a grinding process, thereby to prepare the power roller.

According to the present invention, the power roller has first and second sides which are opposed to each other in an axial direction thereof. This first side has a groove for receiving a bearing, and a surface of the groove (bearing surface) has a carbon concentration which is not lower than that of a surface of the second side (back surface). The power roller prepared by the above method has a hardened outer layer having first and second portions which are disposed on the first and second sides respectively. The first portion of the hardened outer layer is defined as having an exterior boundary which is the bearing surface, and the second portion of the hardened outer layer is defined as having an exterior boundary which is the back surface. The first portion of the hardened outer layer has an effective depth which is not shallower than that of the second portion thereof.

In the invention, the above method may further include a step of quenching the surface-hardened preform, between the steps (a) and (b). The grinding process of the step (b) may include the sequential steps of (1) grinding at least one of first and second outer portions of the surface-hardened preform to remove the same, such that there is obtained a datum that is at least one of the bearing surface and an inner flat surface which are respectively exposed by removing the first and second outer portions, the inner flat surface being positioned closer to a center of the power roller in a radial direction thereof than the groove is; and (2) grinding a third outer portion of the surface-hardened preform, based on the datum, thereby to remove the third outer portion.

According to the present invention, there is further provided a toroidal-type continuously variable transmission having the above-mentioned input side disk, output side disk, and power roller.

By virtue of the present invention, the bearing surface of the power roller becomes high in carbon concentration, and the bearing portion (i.e., the first portion) of the hardened outer layer of the power roller becomes sufficiently deep in effective thickness. Therefore, the bearing surface becomes superior in durability, particularly in rolling fatigue strength, under high temperature and high surface stress.

DESCRIPTION OF THE PREFERRED EMBODIMENTS

Since the basic construction of a toroidal-type continuously variable transmission of the present invention is substantially the same as that of the above-mentioned conventional one, the description thereof will be omitted from the following.

Figure 7:
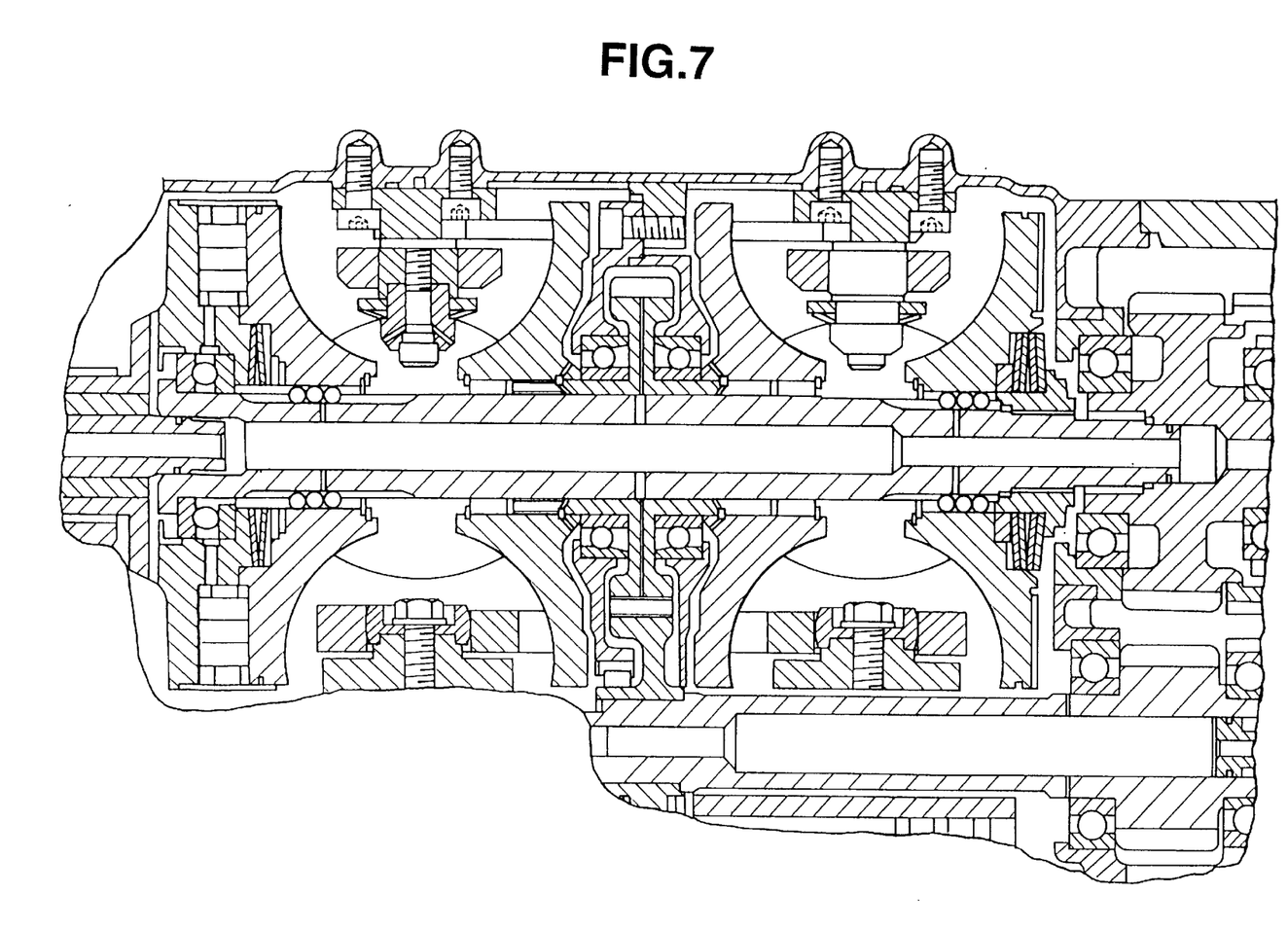
FIG. 7 is a sectional view showing the whole construction of a toroidal-type continuously variable transmission, to which the present invention can also be applied.

As stated above, a rolling element of a toroidal-type continuously variable transmission of the present invention is herein defined as being a combination of the input side disk, the output side disk, and the power roller. FIG. 7 shows the whole construction of a toroidal-type continuously variable transmission, to which the present invention can be applied. As is shown in FIG. 6, each power roller 16 or 17 has a groove for receiving a part of a thrust ball bearing 23. In order to improve the surface of the groove (bearing surface) in rolling fatigue life under high temperature and high surface stress, the material of the power roller is required to be superior in high temperature strength, that is, hardness under high temperature (temper hardness). To meet this requirement, a preform of the power roller may be subjected to a surface-hardening process, that is, a carburizing or carbonitriding process. Regarding the carburizing process, as the carbon concentration of the outer layer of the power roller becomes higher, this outer layer improves in high temperature strength and thus in rolling fatigue life. Similarly, regarding the carbonitriding process, as the carbon and nitrogen concentrations of the outer layer become higher, this outer layer improves in those. In the carburizing process, carbon diffuses from the surface of the power roller toward the interior thereof Therefore, after the carburizing process, the carbon concentration of the power roller is the highest at its surface and decreases toward a deeper position thereof. Similarly, after the carbonitriding process, the carbon and nitrogen concentrations thereof are the highest at its surface and decrease toward that.

Figure 1:
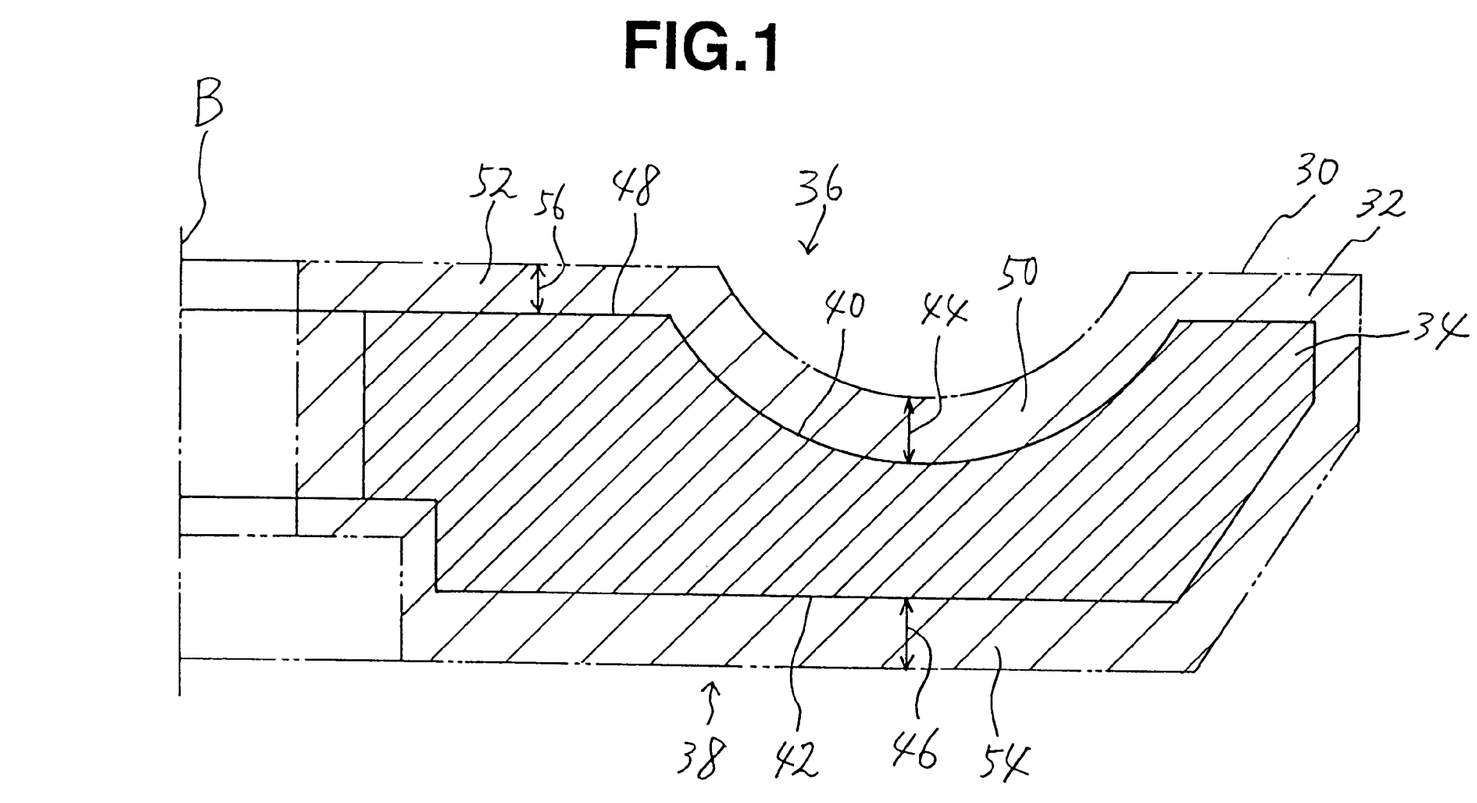
FIG. 1 is an enlarged sectional view showing a right half portion of a power roller according to the present invention.

In the invention, as shown in FIG. 1, the surface-hardened preform 30 of the power roller, which has a configuration as shown by a chain line in FIG. 1, is subjected to a grinding process, thereby to remove the outer peripheral portion 32 of the preform 30. The carbon or carbon and nitrogen concentrations at the surface of the power roller 34 vary with the thickness of this outer peripheral portion 32 to be removed by the grinding process. In fact, in case that the thickness of this outer peripheral-portion 32 is too much, the carbon or carbon and nitrogen concentrations at the surface of the power roller 34 become too low. Furthermore, the dimensions of each power roller 34 after the grinding process are always substantially constant. Therefore, the thickness 44 of the outer peripheral portion 32 on the first side 36 (i.e., the side of the bearing surface) increases with the decrease of the thickness 46 of the outer peripheral portion 32 on the second side 38 (i.e., the side of the back surface) which is opposed to the first side 36. It is necessary to make the bearing surface 40 of the power roller 34 have high carbon or carbon and nitrogen concentrations. With this, the bearing surface 40 becomes superior in rolling fatigue life under high temperature and high surface stress. In contrast, the back surface 42 of the power roller 34 is brought into contact with a needle bearing or sliding bearing, under a far less severe condition than that of the bearing surface 40. Therefore, the back surface 42 of the power roller 34 may have lower carbon or carbon and nitrogen concentrations by a certain degree(s) than those of the bearing surface 40, in order to make the back surface 42 superior in durability. Thus, the bearing surface 40 of the power roller 34 is maintained high in carbon or carbon and nitrogen concentrations by making the thickness 44 of the outer peripheral portion 32 on the first side 36 not thicker than the thickness 46 of the outer peripheral portion 32 on the second side 38. With this, the bearing surface 40 of the power roller 34 will have a carbon concentration which is not lower than that of the back surface 42 thereof. Thus, the rolling fatigue strength of the bearing surface 40 does not decrease so much by the grinding process, thereby to improve the bearing surface in durability.

As is seen from FIG. 1, the power roller 34 of the invention has an inner flat surface 48 which is positioned closer to the center B of the power roller 34 in a radial direction thereof than the groove is. In the invention, it is optional to make the carbon concentration of the bearing surface 40 substantially the same as that of the inner flat surface 48. With this, the carbon concentration of the bearing surface 40 can easily be estimated from that of the inner flat surface 48 by measuring the latter, for example, by emission spectrochemical analysis, without destruction of the bearing surface 40. Thus, quality of each power roller can easily be checked by this estimation with respect to the carbon concentration of the bearing surface. With this, it becomes possible to make the variation of the carbon concentration thereof small and thus the variation of durability thereof small.

As stated above, the grinding process of the invention may include the following first and second sequential steps. The first step is a step of grinding at least one of first and second outer portions 50, 52 of the surface-hardened preform 32 to remove at least one of these first and second outer portions 50, 52. This first portion 50 is defined as being such that the bearing surface 40 will be exposed by the removal of the first portion 50, and the second portion 52 is defined as being such that the inner flat surface 48 will be exposed by the removal of the second portion 52. Herein, at least one of the bearing surface 40 and the inner flat surface 48, which has been exposed by the first step, is defined as a datum. The second step of the grinding process is a step of grinding a third outer portion 54 of the surface-hardened preform 32, based on the datum, thereby to remove the third outer portion 54. In other words, the thickness 46 of the third outer portion 54 to be removed by the second step is determined, based on at least one of the thickness 44 of the first outer portion 50 and the thickness 56 of the second outer portion 52. The third outer portion 54 may be defined as being such that the back surface 42 of the power roller 34 will be exposed by the removal of the third outer portion 54. According to this grinding process, the thickness of at least one of the first and second outer portions 50, 52 can substantially be decreased to a substantially constant value. For example, the first and second steps of the grinding process may be conducted in a manner that the thickness 44 of the first outer portion 50, which causes the bearing surface 40 to be exposed, is not thicker than that 46 of the third outer portion 54, which causes the back surface 42 to be exposed. Thus, the carbon concentration of at least one of the bearing surface 40 and the inner flat surface 48 can substantially be increased to a substantially constant value. This contributes to the improvement of the bearing surface 40 of the power roller 34 in durability. In contrast to the present invention, if the third outer portion 54 is removed prior to the removal of at least one of the first and second outer portions 50, 52, the carbon concentration of at least one of the bearing surface 40 and the inner flat surface 48 may vary to a great extent, depending on the thickness 46 of the third outer portion 54. In the invention, the first step of the grinding process may be conducted by grinding both the first and second outer portions 50, 52 in a manner that the thickness 44 of the first outer portion 50 is substantially the same as that 56 of the second outer portion 52. With this, for example, the carbon concentration of the bearing surface 40 becomes substantially the same as that of the inner flat surface 48. With this, as stated above, the carbon concentration of the bearing surface 40 can easily be estimated from that of the inner flat surface 48 by measuring the latter, without destruction of the bearing surface 40.

Figure 3:
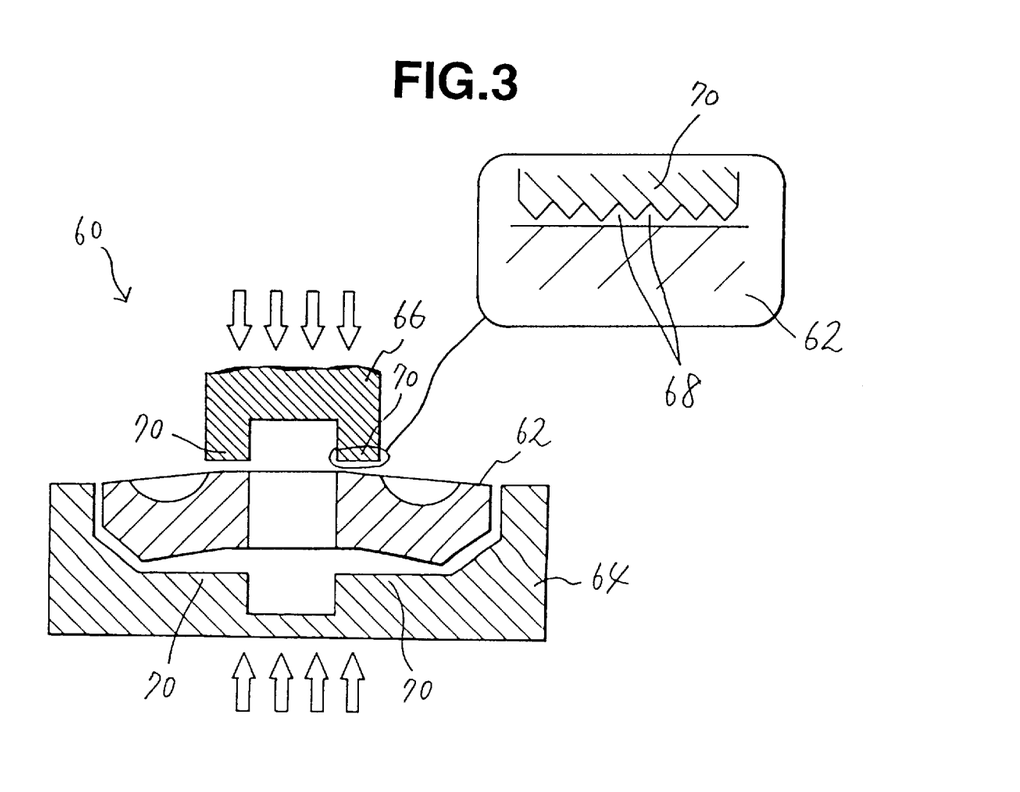
FIG. 3 is a schematic sectional view showing a first exemplary press quenching of a power roller according to the present invention.
Figure 4:
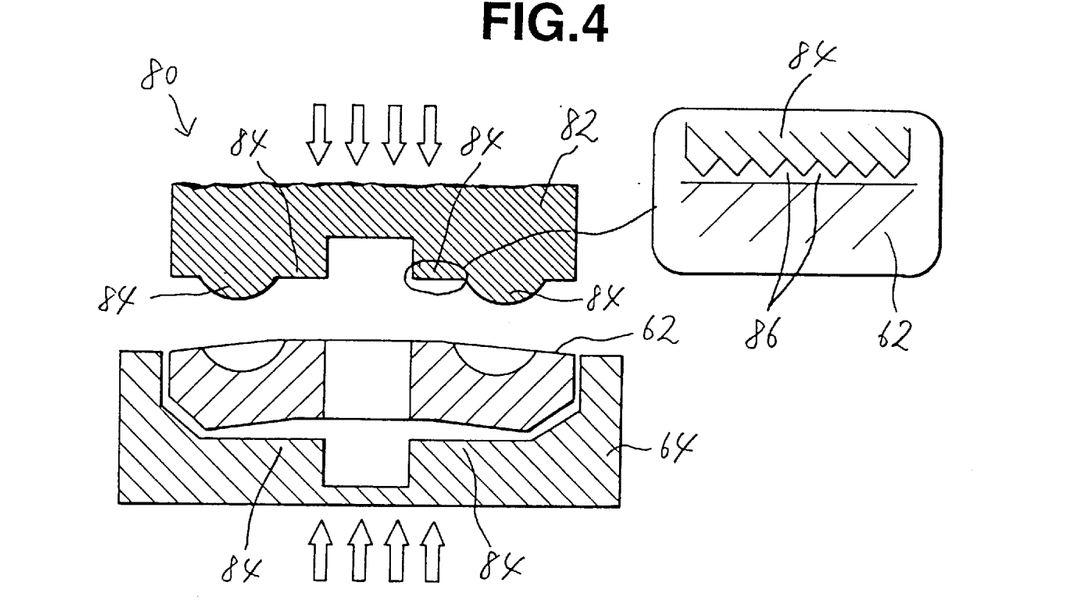
FIG. 4 is a view similar to FIG. 3, but showing a second exemplary press quenching of the same.

In the invention, the quenching of the surface-hardened preform may be conducted by a press quenching between the surface-hardening and grinding processes (see FIGS. 3 and 4). With this, quenching strain can substantially be reduced to a substantially constant value. This also contributes to the improvement of the bearing surface 40 of the power roller 34 in durability. Furthermore, the quenching may be an oil quenching, too.

The following nonlimitative examples are illustrative of the present invention.

EXAMPLE 1

Figure 2:
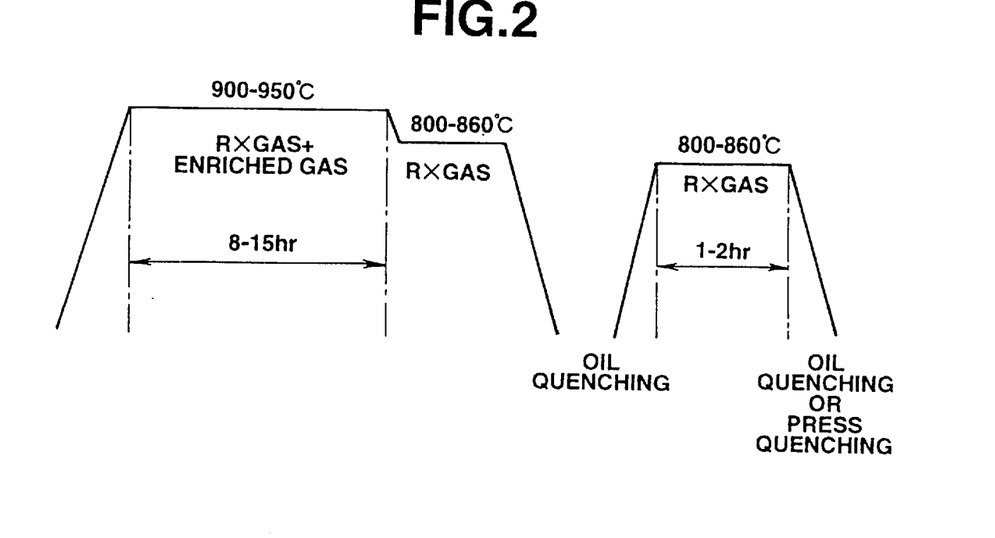
FIG. 2 is a schematic diagram showing a surface-hardening process and a quenching process according to the present invention.

In this example, each power roller used for a toroidal-type continuously variable transmission was prepared as follows. At first, a preform of the power roller was prepared from a hollow cylindrical blister steel having a chemical composition of 0.2 wt % of C, 0.25 wt % of Si, 0.8 wt % of Mn, 1.1 wt % of Cr, 0.15 wt % of Mo, 0.015 wt % of P, 0.009 wt % of S, and the balance of Fe and impurities. Then, as shown in FIG. 2, this preform was subjected to a carburizing process, thereby to prepare a first surface-hardened preform of which hardened layer had an effective depth of from 1.0 to 2.0 mm. The carbon concentration of the surface of the first preform was 1.1 wt %, as shown in Table. Then, as shown in FIG. 2, the first surface-hardened preform was subjected to an oil quenching, thereby to prepare a second surface-hardened preform 30. Then, the second surface-hardened preform 30 was subjected to a grinding process. In the grinding process, as is seen from FIG. 1, at first, a first outer portion 50 of the second surface-hardened preform 30 was removed, thereby to expose the bearing surface 40, such that the carbon concentration of the bearing surface 40 was in a range shown in Table. Then, a second outer portion 52 of the second preform 30 was removed by grinding the same, thereby to expose the inner flat surface 48, such that the carbon concentration of the inner flat surface 48 was in a range shown in Table. The thickness of the second outer portion 52 of each second preform 30 was not regulated to be the same as that of the first outer portion 50 thereof. Thus, the former was slightly different from the latter. After the removal of the first outer portion 50, a third outer portion 54 of the second preform 30 was removed, based on the bearing surface 40 as a datum, to expose the back surface 42. In other words, the thickness 46 of the third outer portion 54 to be removed was determined, based on the thickness 44 of the first outer portion 50. The grinding process was conducted such that the obtained power roller 34 had predetermined constant dimensions. The carbon concentration of the back surface 42 was in a range shown in Table.

EXAMPLE 2

In this example, Example 1 was repeated except in that the thickness 56 of the second outer portion 52 of each second preform 32 was regulated in the grinding process to be substantially the same as that 44 of the first outer portion 50 thereof. Thus, the carbon concentration of the bearing surface 40 of each power roller 34 was substantially the same as that of the inner flat surface 48 thereof, as shown in Table.

EXAMPLE 3

Figure 5:
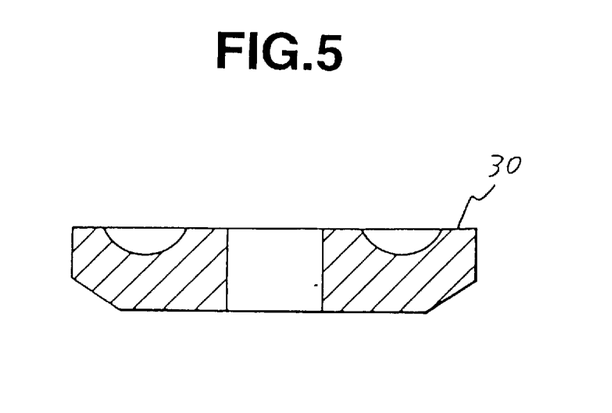
FIG. 5 is a sectional view showing a quenched power roller of the present invention.

In this example, Example 2 was repeated except in that the oil quenching was replaced with a press quenching. In fact, some samples of the first surface-hardened preforms were subjected to a first press quenching, as shown in FIG. 3. In the first press quenching 60, the first surface-hardened preform 62 was pressed between a die 64 and a punch 66, while a quenching oil was allowed to flow along grooves 68 provided on pressing portions 70 of the punch 66 and grooves (not shown) provided on pressing portions 70 of the die 64. These grooves of each pressing portion 70 of the punch 66 and the die 64 had a configuration shown in a magnification of the pressing portion 70 of the punch 66 of FIG. 3. Furthermore, the other samples of the first surface-hardened preforms 62 were subjected to a second press quenching 80, as shown in FIG. 4. The second press quenching was the same as the first press quenching, except in that a punch 82 having a different configuration was used. In fact, this punch 82 had pressing portions 84 each being provided with grooves 86 along which a quenching oil was allowed to flow. These grooves 86 of each pressing portion 84 of the punch 82 and the die 64 also had a configuration shown in a magnification of the pressing portion 84 of the punch 82 of FIG. 4. FIG. 5 shows a second surface-hardened preform 30 prepared by each of the first and second press quenchings 60, 80 shown in FIGS. 3 and 4.

COMPARATIVE EXAMPLE

In this comparative example, Example 1 was repeated except in that the grinding process was modified as follows. In the grinding process, as is seen from FIG. 1, at first, a third outer portion 54 of the second surface-hardened preform 30 was removed, thereby to expose the back surface 42, such that the carbon concentration of the back surface 42 was in a range shown in Table. Then, a first outer portion 50 of the second preform 30 was removed, based on a datum of the back surface 42, to expose the bearing surface 40. After the removal of the third outer portion 54, a second outer portion 52 of the second preform 30 was removed, thereby to expose the inner flat surface 48, such that the carbon concentration of the inner flat surface 48 was in a range shown in Table. The thickness 56 of the second outer portion 52 of each second preform 30 was not regulated to be the same as that 44 of the first outer portion 50 thereof. Thus, the former 56 was slightly different from the latter 44.

TABLE

|  | Surface-hardening Process & Quenching | Datum in Grinding Process | Surface Carbon Conc. after Surface-hardening Process (wt %) | Carbon Conc. of Bearing Surface after Grinding Process (wt %) | Carbon Conc. of Back Surface after Grinding Process (wt %) | Carbon Conc. of Inner Flat Surface after Grinding Process (wt %) |
| --- | --- | --- | --- | --- | --- | --- |
| Example 1 | Carburizing & Oil Quenching | Bearing Surface | 1.1 | 0.8–1.0 | 0.5–0.8 | 0.75–0.95 |
| Example 2 | Carburizing & Oil Quenching | Bearing Surface | 1.1 | 0.8–1.0 | 0.5–0.8 | 0.8–1.0 |
| Example 3 | Carburizing & Press Quenching | Bearing Surface | 1.1 | 0.95–1.05 | 0.6–0.75 | 0.95–1.05 |
| Com. Ex. | Carburizing & Oil Quenching | Back Surface | 1.1 | 0.5–0.8 | 0.8–1.0 | 0.55–0.8 |

What is claimed is:

1. A rolling element used for a toroidal-type continuously variable transmission, said rolling element comprising:
    an input side disk adapted to be disposed on an input shaft of said transmission;
    an output side disk adapted to be disposed on an output shaft of said transmission; and
    a power roller for transmitting motive power of the input shaft to the output shaft, while engaging both said input side disk and said output side disk, said power roller being adapted to be pivotably attached to a trunnion through a pivot,
    wherein said power roller is prepared by a method comprising the sequential steps of:
    (a) subjecting a perform of said power roller to a surface-hardening process which is one of a carburizing process and a carbonitriding process, thereby to prepare a surface-hardened preform; and
    (b) subjecting said surface-hardened preform to a grinding process, thereby to prepare said power roller,
    wherein said power roller has first and second sides which are opposed to each other in an axial direction thereof, said first side having a groove for receiving a bearing that is adapted to be interposed between said power roller and said trunnion, a surface of said groove having a carbon concentration which is higher than that of a surface of said second side, said power roller prepared by said method having a hardened outer layer having first and second portions which are disposed on said first and second sides respectively, said first portion of said hardened outer layer being defined as having an exterior boundary which is said surface of said groove, said second portion of said hardened outer layer being defined as having an exterior boundary which is said surface of said second side, said first portion of said hardened outer layer having an effective depth which is thicker than that of said second portion thereof.

2. A rolling element according to claim 1, wherein said first side of said power roller has an inner flat surface which is positioned closer to a center of said power roller in a radial direction thereof than said groove is, said carbon concentration of said surface of said groove being substantially the same as that of said inner flat surface.

3. A rolling element according to claim 2, wherein said hardened outer layer of said power roller has a third portion which is disposed on said first side, said third portion being defined as having an exterior boundary which is said inner flat surface of said power roller, said first portion of said hardened outer layer having an effective depth which is substantially the same as that of said third portion thereof.

4. A rolling element according to claim 1, wherein said method for preparing said power roller further comprises between the steps of (a) and (b) the step of (c) subjecting said surface-hardened perform to a quenching.

5. A rolling element according to claim 4, wherein said quenching of the step (c) is an oil quenching.

6. A rolling element for a toroidal-type continuously variable transmission, said rolling element comprising:

an input side disk adapted to be disposed on an input shaft of said transmission;

an output side disk adapted to be disposed on an output shaft of said transmission; and a power roller for transmitting motive power of the input shaft to the output shaft, while engaging both said input side disk and said output side disk, said power roller being adapted to be pivotably attached to a trunnion through a pivot, wherein said power roller is prepared by a method comprising the sequential steps of:

(a) subjecting a perform of said power roller to a surface-hardening process which is one of a carburizing process and a carbonitriding process, thereby to prepare a surface-hardened preform;

(b) subjecting said surface-hardened perform to an oil quenching; and (c) subjecting said surface-hardened preform to a grinding process, thereby to prepare said sower roller, wherein said power roller has first and second sides which are opposed to each other in an axial direction thereof, said first side having a groove for receiving a bearing that is adapted to be interposed between said Dower roller and said trunnion, a surface of said groove having a carbon concentration which is higher than that of a surface of said second side, said power roller prepared by said method having a hardened outer layer having first and second portions which are disposed on said first and second sides respectively, said first portion of said hardened outer layer being defined as having an exterior boundary which is said surface of said groove, said second portion of said hardened outer layer being defined as having an exterior boundary which is said surface of said second side, said first portion of said hardened outer layer having an effective depth which is thicker than that of said second portion thereof, and wherein said carbon concentration of said surface of said groove ranges from about 0.8 to about 1.0 wt %, and wherein said carbon concentration of said surface of said second side ranges from about 0.5 to about 0.8 wt %.

7. A rolling element used for a toroidal-type continuously variable transmission, said rolling element comprising:

an input side disk adapted to be disposed on an input shaft of said transmission;

an output side disk adapted to be disposed on an output shaft of said transmission; and a power roller for transmitting motive power of the input shaft to the output shaft, while engaging both said input side disk and said output side disk, wherein said power roller is Prepared by a method comprising the sequential steps of:

(a) subjecting a preform of said sower roller to a surface-hardening process which is one of a carburizing process and a carbonitriding process, thereby to prepare a surface-hardened preform; and (b) subjecting said surface-hardened preform to a grinding process, thereby to prepare said Power roller, wherein said power roller has first and second sides which are opposed to each other in an axial direction thereof, said first side having a groove for receiving a bearing surface of said groove having a carbon concentration which is higher than that of a surface of said second side, said power roller prepared by said method having a hardened outer layer having first and second portions which are disposed on said first and second sides respectively, said first Portion of said hardened outer layer being defined as having an exterior boundary which is said surface of said groove, said second portion of said hardened outer layer being defined as having an exterior boundary which is said surface of said second side, said first portion of said hardened outer layer having an effective depth which is thicker than that of said second portion thereof, wherein said first side of said power roller has an inner flat surface which is positioned closer to a center of said power roller in a radial direction thereof than said groove is, and wherein each of said carbon concentration of said surface groove and that of said inner flat surface ranges from about 0.8 to about 1.0 wt %.

8. A rolling element used for a toroidal-type continuously variable transmission, said rolling element comprising:

an input side disk adapted to be disposed on an input shaft of said transmission;

an output side disk adapted to be disposed on an output shaft of said transmission; and a power roller for transmitting motive power of the input shaft to the output shaft, while engaging both said input side disk and said output side disk, wherein said power roller is prepared by a method comprising the sequential steps of:

(a) subjecting a preform of said power roller to a surface-hardening process which is one of a carburizing process and a carbonitriding process, thereby to prepare a surface-hardened preform; and (b) subjecting said surface-hardened preform to a grinding process, thereby to prepare said power roller, wherein said power roller has first and second sides which are opposed to each other in an axial direction thereof, said first side having a groove for receiving a bearing a surface of said groove having a carbon concentration which is higher than that of a surface of said second side, said power roller prepared by said method having a hardened outer layer having first and second portions which are disposed on said first and second sides respectively, said first portion of said hardened outer layer being defined as having an exterior boundary which is said surface of said groove, said second portion of said hardened outer layer being defined as having an exterior boundary which is said surface of said second side, said first portion of said hardened outer layer having an effective depth which is thicker than that of said second portion thereof, wherein said first side of said power roller has an inner flat surface which is positioned closer to a center of said power roller in a radial direction thereof than said groove is, and wherein a quenching step (c) which is carried out between step (a) and step (b), is a press quenching, wherein said carbon concentration of said surface of said groove and that of said inner flat surface are substantially the same and each within a range of from about 0.95 to about 1.05 wt %, and wherein said carbon concentration of said surface of said second side ranges from about 0.6 to about 0.75 wt %.

9. A method for producing a rolling element used for a toroidal-type continuously variable transmission, said rolling element including an input side disk adapted to be disposed on an input shaft of said transmission; an output side disk adapted to be disposed on an output shaft of said transmission; and a power roller for transmitting motive power of the input shaft to the output shaft, while engaging both said input side disk and said output side disk, said power roller being adapted to be pivotably attached to a trunnion through a pivot, said power roller having first and second sides which are opposed to each other in an axial direction thereof, said first side having a groove for receiving a bearing and an inner flat surface which is positioned closer to a center of said power roller in a radial direction thereof than said groove is, said bearing being adapted to be interposed between said power roller and said trunnion, said method comprising the sequential steps of:

(a) subjecting a preform of said power roller to a surface-hardening process which is one of a carburizing process and a carbonitriding process, thereby to prepare a first surface-hardened preform;

(b) quenching said first surface-hardened preform to prepare a second surface-hardened preform; and (c) subjecting said second surface-hardened preform to a grinding process, thereby to prepare said power roller, said grinding process comprising the sequential steps of:

(1) grinding at least one of first and second outer portions of said second surface-hardened preform to remove the same, such that there is obtained a datum that is at least one of said surface of said groove and said inner flat surface which are respectively exposed by removing said first and second outer portions; and (2) grinding a third outer portion of said second surface-hardened preform, based on said datum, thereby to remove said third outer portion.

10. A method according to claim 9, wherein a surface of said second side of said power roller is exposed by removing said third outer portion of the step (2).

11. A method according to claim 10, wherein a thickness of said third outer portion to be removed by the step (2) is determined based on at least one of a thickness of said first outer portion and a thickness of said second outer portion, such that each power roller prepared by said method has a substantially constant thickness in an axial direction thereof.

12. A method according to claim 11, wherein the step (1) is conducted by grinding at least said first outer portion of said second surface-hardened preform, thereby to remove said first outer portion and to expose said datum which is said surface of said groove, and wherein steps (1) and (2) are conducted in a manner that a thickness of said first outer portion is shallower than that of said third outer portion.

13. A method according to claim 9, wherein the step (1) is conducted by grinding both of said first and second outer portions of said second surface-hardened preform, thereby to remove both of said first and second outer portions and to expose said datum which is both of said surface of said groove and said inner flat surface, and wherein the step (1) is conducted such that a thickness of said first outer portion is substantially the same as that of said second outer portion and thus that a carbon concentration of said surface of said groove becomes substantially the same as that of said inner flat surface.

14. A method for producing a rolling element used for a toroidal-type continuously variable transmission, said rolling element including an input side disk adapted to be disposed on an input shaft of said transmission; an output side disk adapted to be disposed on an output shaft of said transmission; and a power roller for transmitting motive power of the input shaft to the output shaft, while engaging both said input side disk and said output side disk, said power roller having first and second sides which are opposed to each other in an axial direction thereof, said first side having a groove for receiving a bearing and an inner flat surface which is positioned closer to a center of said power roller in a radial direction thereof than said groove is, said method comprising the sequential steps of:

(a) subjecting a preform of said power roller to a surface-hardening process which is one of a carburizing process and a carbonitriding process, thereby to prepare a first surface-hardened preform;

(b) quenching said first surface-hardened preform to prepare a second surface-hardened preform; and (c) subjecting said second surface-hardened preform to a grinding process, thereby to prepare said power roller, said grinding process comprising the sequential steps of:

(1) grinding at least one of first and second outer portions of said second surface-hardened preform to remove the same, such that there is obtained a datum that is at least one of said surface of said groove and said inner flat surface which are respectively exposed by removing said first and second outer portions; and (2) grinding a third outer portion of said second surface-hardened preform, based on said datum, thereby to remove said third outer portion, wherein after the step (1) a carbon concentration of said inner flat surface is measured.

15. A method for producing a rolling element used for a toroidal-type continuously variable transmission, said rolling element including an input side disk adapted to be disposed on an input shaft of said transmission; an output side disk adapted to be disposed on an output shaft of said transmission; and a power roller for transmitting motive power of the input shaft to the output shaft, while engaging both said input side disk and said output side disk, said power roller having first and second sides which are opposed to each other in an axial direction thereof, said first side having a groove for receiving a bearing and an inner flat surface which is positioned closer to a center of said power roller in a radial direction thereof than said groove is, said method comprising the sequential steps of:

(a) subjecting a preform of said power roller to a surface-hardening process which is one of a carburizing process and a carbonitriding process, thereby to prepare a first surface-hardened preform;

(b) quenching said first surface-hardened preform to Prepare a second surface-hardened preform: and (c) subjecting said second surface-hardened preform to a grinding process, thereby to prepare said power roller, said grinding process comprising the sequential steps of:

(1) grinding at least one of first and second outer portions of said second surface-hardened preform to remove the same, such that there is obtained a datum that is at least one of said surface of said groove and said inner flat surface which are respectively exposed by removing said first and second outer portions; and (2) grinding a third outer portion of said second surface-hardened preform, based on said datum, thereby to remove said third outer portion, wherein the step (1) is conducted by grinding both of said first and second outer portions of said second surface-hardened preform, thereby to remove both of said first and second outer portions and to expose said datum which is both of said surface of said groove and said inner flat surface, and wherein the step (1) is conducted such that a thickness of said first outer portion is substantially the same as that of said second outer portion and thus that a carbon concentration of said surface of said groove becomes substantially the same as that of said inner flat surface, and wherein after the step (1) a carbon concentration of said inner flat surface is measured, thereby to estimate a carbon concentration of said surface of said groove from said carbon concentration of said inner flat surface.

16. A method according to claim 15, wherein said carbon concentration of said inner flat surface is measured by emission spectrochemical analysis.

17. A method according to claim 9, wherein said surface-hardening process of the step (a) is conducted such that said first surface-hardened preform has a hardened layer having an effective depth of from about 1.0 mm to about 2.0 mm.

18. A method according to claim 9, wherein the step (b) is conducted by a press quenching.

19. A toroidal-type continuously variable transmission comprising:

an input side disk disposed on an input shaft of said transmission;

an output side disk disposed on an output shaft of said transmission; and a power roller for transmitting motive power of the input shaft to the output shaft, while engaging both said input side disk and said output side disk, said power roller being adapted to be pivotably attached to a trunnion through a pivot, wherein said power roller is prepared by a method comprising the sequential steps of:

(a) subjecting a preform of said power roller to a surface-hardening process which is one of a carburizing process and a carbonitriding process, thereby to prepare a surface-hardened preform; and (b) subjecting said surface-hardened preform to a grinding process, thereby to prepare said power roller, wherein said power roller has first and second sides which are opposed to each other in an axial direction thereof, said first side having a groove for receiving a bearing that is adapted to be interposed between said power roller and said trunnion, a surface of said groove having a carbon concentration which is higher than that of a surface of said second side, said power roller prepared by said method having a hardened outer layer having first and second portions which are disposed on said first and second sides respectively, said first portion of said hardened outer layer being defined as having an exterior boundary which said surface of said groove, said second portion of said hardened outer layer being defined as having an exterior boundary which is said surface of said second side, said first portion of said hardened outer layer having an effective depth which is thicker than that of said second portion thereof.

20. A rolling element according to claim 1, wherein said effective depth of said first portion of said hardened outer layer is not less than 1 mm and is less than 2 mm.

* * * * *